United States Patent [19]

Clark et al.

[11] 3,988,289

[45] Oct. 26, 1976

[54] MOLDING COMPOSITIONS OF A RESIN AND HYDRATED CEMENT

[75] Inventors: Jeri O. Clark, Granville; Bobby J. Hankins; Walter D. Cottrell, Jr., both of Newark, all of Ohio

[73] Assignee: Owens-Corning Fiberglas Corporation, Toledo, Ohio

[22] Filed: Aug. 11, 1975

[21] Appl. No.: 603,427

[52] U.S. Cl. ................................. 260/38; 106/90; 260/29.3
[51] Int. Cl.² ...................... C08L 3/30; C08L 61/10
[58] Field of Search ............... 106/90; 260/29.3, 38

[56] References Cited
UNITED STATES PATENTS

| | | | |
|---|---|---|---|
| 3,016,092 | 1/1962 | Harvey et al. | 260/38 X |
| 3,070,572 | 12/1962 | Oland et al. | 260/38 X |
| 3,130,172 | 4/1964 | Harvey et al. | 260/38 X |
| 3,216,966 | 11/1965 | Collins et al. | 260/38 |
| 3,297,599 | 1/1967 | Eschen | 260/38 X |
| 3,415,773 | 12/1968 | Collins et al. | 260/38 |
| 3,415,774 | 12/1968 | Hood et al. | 260/38 |
| 3,502,610 | 3/1970 | Thompson | 260/38 |
| 3,666,703 | 5/1972 | Murata et al. | 260/38 X |
| 3,714,113 | 1/1973 | Kingston | 260/40 R |
| 3,944,515 | 3/1976 | Foley et al. | 260/38 |

*Primary Examiner*—Lewis T. Jacobs
*Assistant Examiner*—S. M. Person
*Attorney, Agent, or Firm*—John W. Overman; Patrick P. Pacella

[57] ABSTRACT

We have developed molding compositions comprising a mixture of phenolic resin and hydrated cement. A minimum amount of hydration in the cement provides strength and cure enhancement to the phenolic resin. We think the hydrated cement acts as a processing aid to the phenolic resin because of surface activity.

17 Claims, No Drawings

MOLDING COMPOSITIONS OF A RESIN AND HYDRATED CEMENT

This invention relates to molding compounds comprising a mixture of phenolic resins and hydrated cement.

The majority of synthetic resins have enjoyed many fruitful years in the plastics industry. The future, however, may prove to be less receptive. Building codes will be stricter. Materials will cost more; much more. Avoiding these factors will not be easy. For example, merely loading the resins with heavy doses of a flame retardant may not be sufficient as it was in the past. Often, these loadings will interfere with the molding properties of the resin. Frequently, they will be expensive or interfere with the strength of the molded article.

The plastics industry has commonly employed hydrated alumina as a cheap, inexpensive filler. Recent developments include molding compounds containing stoichiometric amounts of hydraulic cement. These molding compounds containing hydraulic cement perform well.

We now have discovered, however, that a minimum amount of hydration in the hydraulic cement provides strength and cure enhancement to the phenolic resin. We think the hydrated cement acts as a processing aid to the phenolic resin because of surface activity.

The interactions of cement compounds with water are of two kinds: water of hydrolysis and water of hydration. Both occur simultaneously. Water of hydrolysis is an interaction with water such that the H+ ion of the water becomes associated with an anion of the cement compound and the OH— ion becomes associated with a cation. In hydration, the crystal structure of the cement compound takes on water.

Our invention, of course, includes both water of hydrolysis and water of hydration. A detailed discussion of these types of water appears in *The Chemistry of Portland Cements*, Bogue, Reinhold Publishing Corporation, 1955.

Preferably, we add the water to the hydraulic cement before adding them to the phenolic resin. We can, however, mix the resin and cement together before we add water. In each mix the total water content can vary widely.

For example, we found the water of hydration of typical Type I Portland cement to be about 1.0 percent. To a sample of the same Portland cement, we added 0.15 parts by weight of water per part by weight of cement and hydrated it for 24 hours. We found the water of hydration of this sample to be 6.15 percent. In addition, we found a standard Portland cement sample hydrated for 7 years to have a water of hydration content of 12.3 percent.

The phenolic resin we employ is a Phenol-formaldehyde condensate or a phenol-amino compound-formaldehyde condensate. The amino compounds we employ generally are urea, melamine, or dicyandiamide.

Producing phenolic moldings is an old art, having involved, over the years, the use of two different types of phenol-formaldehyde condensate: novolacs and resoles. A detailed discussion of phenol-formaldehyde condensates appears in *The Chemistry of Phenolic Resins*, Martin, John Wiley & Sons, Inc., 1956, and cited references.

In our invention, the phenolic resin and hydrated cement have a weight ratio of resin solids to hydrated cement ranging from 1:9 to 9:1. Please note that a mixture of phenolic resin and cement having a weight ratio of resin solids to hydrated cement of 8:2 has a volume ratio of about 1:1.

With regard to the total water content, it should be at least 2% by weight. Total water content includes the water of hydration and the water of hydrolysis. Preferably, the total water content ranges from 2 to 25 percent by weight.

To produce the hydrated cement, we can agitate ground cement clinker in a water slurry for a period of time. We then dry the hydrate. If necessary, we then grind to a desired particle size.

For example, we allow a cementitious material such as Portland cement to hydrate in a water slurry under constant agitation. We use any combination of water and cement that will not settle during hydration, preferably two parts of water to one part of cement by weight. The degree of hydration we achieved is time dependent and the rate decreases with time as hydration proceeds to the interior of the ground clinker. From 1 to 28 days is a practical process time with two days producing a desirable product. We wash the individually hydrated ground clinkers to remove alkaline materials produced in the hydration reaction. We accomplish this by filtration or settling of the hydrated ground clinkers followed by agitation in fresh water. We then dry the hydrated ground clinkers and introduce them into any plastic resin for molding.

Pulverizing naturally occurring hydraulic calcium silicate clinker produces hydraulic cement. The clinker generally includes silica, alumina, lime, iron oxide, and magnesia. The resulting powder hardens when mixed with water. Hydraulic cements include Portland, calcium-aluminate, magnesia, natural, masonry, pozzolana, and slag cements.

We can use the hydrate of any of these cements.

These molding compounds have good flame resistance and low smoke-producing properties. They can be used to form shingles, appliances such as bathtubs, and coatings.

We can incorporate the molding compounds of our invention into either a sheet molding compound (SMC) or a bulk molding compound (BMC). We do this by the addition of glass fibers in an amount greater than 0 up to about 60 percent by weight of the resulting sheet or bulk molding compound.

In both SMC and BMC we prefer to add a mold release agent in an amount up to about 5 percent by weight of the sheet or bulk molding compound. A particularly suitable mold release agent is zinc stearate.

In addition, in our sheet or bulk molding compounds we can also include a silane coupling agent or a mixture of silane coupling agents in a total amount of from about 0.01 to about 5 percent by weight of the compound to increase the strength properties of the resulting moldings. Particularly suitable silane coupling agents are "A-1100" and "Tetraethyl Orthosilicate," commercially available from Union Carbide Corporation. A-1100 is gamma-aminopropyltriethoxysilane and Tetraethyl Orthosilicate is tetraethoxysilane. These perform best when we coat them on the fibers in the molding compounds.

Our molding compounds also can contain fillers such as clay.

The following examples illustrate our invention.

EXAMPLE I

This example demonstrates a method of producing a phenolic resin for our invention.

| Charge | Mole Ratio | Weight Percent |
|---|---|---|
| Formaldehyde | 2.0 | 28.4 |
| Phenol | 1.0 | 43.4 |
| Water | | 26.1 |
| Triethylamine | | 2.1 |

We charged the phenol, formaldehyde, and water to a reactor and then blended and heated them to a temperature of 150° F. We then added the triethylamine catalyst over a 90-minute period while maintaining the temperature at 150° F. Next we continued the reaction for 5½ hours at 150° F. At this time, the reaction mixture had a free formaldehyde content of 3.8 weight percent and a viscosity of 43.4 cps. We then stripped the reaction mixture to a water solution of about 8 to 10 weight percent.

EXAMPLE II

We prepared a sheet molding compound (SMC) from the resin of Example I. The resin was still in the water soluble A stage at the time we added it to the clinker. the SMC had the following make-up:

| Ingredients | Weight Percent |
|---|---|
| Resin of Example I | 35 |
| Hydrated Ground Cement Clinker | 39 |
| Mold Release and Fillers | 4 |
| Water | 2 |
| Glass Fibers, 1" length | 20 |

We formed the clinker by hydrating Type I Portland cement and grinding it to pass through 200 mesh screen. The total water content was 12.80 percent and the water of hydration was 6.15 percent.

We added the 2 percent additional water to the make-up to reduce the viscosity of the paste.

We blended all the materials and then molded the resulting material in closed hot matched die molds at a temperature of 300° F at a pressure of 1000 psi for five minutes. We "bumped" and opened the mold 6 times during the initial portion of the molding cycles to allow for the escape of steam. The resulting molded panel was 12 × 12 inches with a thickness of 1/10 of an inch. It showed no cracking or breaking on visual inspection.

We tested the panel we produced for flexural modulus, flexural strength, and hardness.

We determined flexural strength and flexural modulus according to ASTM Specification D790 and Rockwell hardness according to ASTM D785-65.

The following table gives the results:

| | Flexural Strength psi × $10^3$ | Flexural Modulus psi × $10^6$ | Rockwell M Hardness |
|---|---|---|---|
| Example II | 20.44 | 2.017 | 104.9 |

This panel had a smooth surface with good gloss and replication of the mold surface. This panel demonstrates a good balance of mechanical and physical properties with good flexibility (less brittle or low modulus) without sacrificing strength.

EXAMPLE III

We prepared bulk molding compounds from a commercial B staged novolac resin which is insoluble in water. Each sample contained 5% by weight of glass fibers and had the following phenolic resin solids/dry cement weight ratio:

| Sample | Phenolic resin solid/ dry cement ratio by weight |
|---|---|
| 1 | 8/2 |
| 2 | 7/3 |
| 3 | 6/4 |
| 4 | 5/5 |
| 5 | 4/6 |
| 6 | 7/3 |
| 7 | 6/4 |
| 8 | 5/5 |
| 9 | 4/6 |
| 10 | 3/7 |
| 11 | 2/8 |
| 12 | 1/9 |

The cement or ground clinker we employed in all cases was Type I Portland cement. Before hydration, it had a total water content of 1.9 weight percent.

We hydrated the cement in all samples after we blended it with the phenolic resins. We add the cement to the B staged resin and then add the water. Because the resin is in the B stage, it won't dissolve in the water. We then thoroughly blend the ingredients by stirring or kneading.

We hydrated the cement of Samples 1 to 5 with 0.35 parts by weight of $H_2O$ per part of dry cement for 24 hours.

We hydrated the cement of Samples 6 to 10 with 0.53 parts by weight of $H_2O$ per part of dry cement for 24 hours.

And we hydrated Samples 11 and 12 with 0.17 parts by weight of water per part of dry cement for 24 hours.

Each sample contained small amounts of zinc stearate mold release.

The individual glass fibers had a length within the range of from about ⅛ inch to about 1¼ inches and a diameter within the range of from about 0.00025 to about 0.000299 inch.

We blended all the materials except the glass fibers thoroughly by mixing. We then thoroughly mix the blend with the fibers by stirring or kneading and place a sample of this in the mold usually in log form.

We molded the resulting material in closed hot matched die molds at a temperature ranging from 300° to 350° F at a pressure of almost 1000 psi for about three minutes. The resulting panels exhibited no cracking or breaking.

We tested the moldings we produced for flexural modulus, flexural strength, tensile strength, tensile modulus, and hardness.

We determined flexural strength and flexural modulus according to ASTM Specification D790, tensile strength and tensile modulus according to ASTM Specification D638, and Barcol hardness according to D2583-67.

We made all tests at 73.4° F and 50% relative humidity.

The following table gives the results.

| Samples | Flexural Strength psi × $10^3$* | Modulus psi × $10^6$* | Tensile Strength psi × $10^3$* | Modulus psi × $10^6$* | Barcol Hardness* |
|---|---|---|---|---|---|
| 1 | 5.38 | 1.123 | 1.30 | 1.311 | 52 |
| 2 | 6.40 | 1.055 | 2.67 | 1.245 | 36 |
| 3 | 6.59 | 0.844 | 2.75 | 1.080 | 38 |
| 4 | 7.05 | 0.871 | 2.93 | 1.001 | 39 |
| 5 | 5.87 | 0.756 | 2.61 | 0.957 | 42 |
| 6 | 5.29 | 0.794 | 2.33 | 1.279 | 22 |
| 7 | 4.98 | 0.666 | 1.92 | 0.946 | 15 |
| 8 | 6.26 | 0.698 | 3.27 | 0.996 | 31 |
| 9 | 7.36 | 0.745 | 3.14 | 0.983 | 35 |
| 10 | 5.72 | 0.675 | 2.86 | 0.746 | 35 |
| 11 | 5.99 | 1.518 | 2.95 | 2.328 | 46 |
| 12 | 6.72 | 1.308 | 2.94 | 1.644 | 52 |

*All results are the average to 5 specimens.

This data of Examples II and III reflect the excellent mechanical properties of our phenolic/hydrated cement products. A minimum amount of hydration in the hydraulic cement provides strength and cure enhancement to the phenolic resin. The fact that the strengths do not decline as the amount of cement increases and the amount of resin decreases demonstrates this.

Based on our experience with composites of hydraulic cement and phenolic resins, a molded article from our composition should exhibit excellent flame resistance in a fire. Not only should the burning rate be low, but smoke generation and fuel contribution also should be less.

We intend to include modifications and variations within the scope and spirit of this invention.

We claim:

1. An uncured moldable composition comprising a phenolic resin and hydrated cement,
    wherein the phenolic resin and hydrated cement have a weight ratio of resin to cement ranging from 1:9 to 9:1 based on the weight of hydrated cement and on resin solids,
    wherein the hydrated cement has a total water content of at least 2 percent by weight, and
    wherein the resin is a phenol-formaldehyde condensate or a phenol-amino compound-formaldehyde condensate.

2. A composition according to claim 1 wherein the hydrated cement has a total water content ranging from 2 to 25 percent by weight.

3. A composition according to claim 1 wherein the hydrated cement has a total water content of 12.80 percent by weight.

4. A composition according to claim 1 wherein the hydrated cement has a water of hydration content ranging from 2 to 12.3 percent by weight.

5. A composition according to claim 1 wherein the hydrated cement has a water of hydration content of 6.5 percent by weight.

6. A composition according to claim 1 including glass fibers in addition to the resin and cement.

7. A composition according to claim 6 wherein the glass fibers are present in an amount of up to 0 to 60 weight percent based on the weight of the uncured moldable composition.

8. A composition according to claim 1 wherein the amino compound is urea, melamine, or dicyandiamide.

9. A composition according to claim 1 wherein the resin is a phenol-formaldehyde condensate.

10. A composition according to claim 1 wherein the hydrated cement is Type I Portland cement.

11. A molded article formed by curing under pressure the composition of claim 1.

12. A sheet molding compound comprising a phenol-formaldehyde condensate, hydrated ground cement clinker, and glass fibers,
    wherein the hydrated clinker has a total water content of at least 2 percent by weight, and
    wherein the condensate and hydrated clinker have a weight ratio of condensate to clinker ranging from 1:9 to 9:1 based on the weight of hydrated clinker and on condensate solids.

13. A sheet molding compound according to claim 12 wherein:
    a. the phenol-formaldehyde condensate has a mole ratio of formaldehyde to phenol of 2:1;
    b. the condensate is present in an amount of 35 weight percent;
    c. the ground clinker is present in an amount of 39 weight percent; and
    d. the glass fibers are present in an amount of 20 weight percent.

14. A molded panel formed by curing under pressure the compound of claim 12.

15. A bulk molding compound comprising a B-staged novolac resin, hydrated Type I Portland cement, and glass fibers,
    wherein the hydrated cement has a total water content of at least 2 percent by weight, and
    wherein the novolac resin and cement have a mole ratio ranging from 1:9 to 9:1.

16. A bulk molding compound according to claim 15 wherein the glass fibers are present in an amount of 5 weight percent.

17. A molded panel formed by curing under pressure the compound of claim 15.

* * * * *